Aug. 23, 1966 R. E. ANDERSON 3,268,374

METHOD OF PRODUCING A FIELD-EFFECT TRANSISTOR

Filed April 24, 1963 2 Sheets-Sheet 1

Robert E. Anderson
INVENTOR

BY

ATTORNEY

Robert E. Anderson
INVENTOR

BY

ATTORNEY 3,268,374

METHOD OF PRODUCING A FIELD-EFFECT TRANSISTOR

Robert E. Anderson, Kingsville, Tex., assignor to Texas Instruments Incorporated, Dallas, Tex., a corporation of Delaware Filed Apr. 24, 1963, Ser. No. 275,308
9 Claims. (Cl. 148—175)

This invention relates to transistors and more particularly to field-effect transistors.

A field-effect transistor is a device which has a semiconductor current path whose resistance is modulated by the application of a transverse electric field. The field is created by reverse biasing a P-N junction, which causes depletion (removal of current carriers) and thereby controls the conductive thickness of the current path. The present invention effectively reduces the amount of voltage (pinch-off voltage) necessary to control the conductance of the current path when compared to the voltage required with a field-effect transistor of conventional design, and among other things provides the possibility of a plurality of isolated current paths. A portion of the current path is often referred to as the channel and more specifically it is the channel region which is modulated. Through the utilization of such current paths, greater power handling capabilities exist for a given pinch-off voltage.

It is, then, an object of the invention to provide a transistor requiring lower pinch-off voltage for the same transconductance than previously available.

Another object is to provide a field-effect transistor having multiple isolated current paths.

Still another object is to provide a field-effect transistor having increased power handling capabilities.

Other objects and features of the invention will be apparent from the following detailed description, taken in conjunction with the appended claims and the attached drawings in which:

Figure 5:
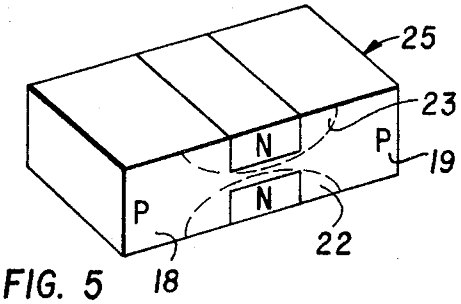
FIGURE 5 depicts a field-effect transistor of conventional design showing the space charge around the junction extending into the channel region.
Figure 7:
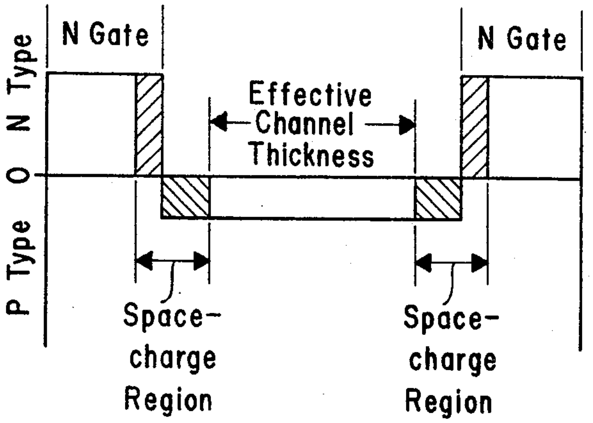
FIGURE 7 is a diagram illustrating the effective channel thickness due to space charge.

The preferred embodiment of the field-effect transistor of the present invention may be described by comparing it with a field-effect transistor of conventional design. As to the latter, shown in FIGURE 5, a silicon bar 25 doped with P-type impurity has N-type impurities introduced into the opposite sides thereof, creating P-N junctions. The N-type regions are called the "gate regions" and the portion of the P-type bar between the gate regions is called the "channel." One end of the P-type region is called the source 18 and the other end is called the drain 19. Applying a reverse voltage to the gate-channel junction causes the conductance of the channel to decrease because of a widening of the space charge regions 22 and 23. These space charge regions result when the channel-gate junction is back biased. As illustrated in FIGURE 7, the space charge will extend further into the P-type channel than into the N-type gate since the charges stored on each side of the junction are the same and the impurity concentration is greater in the N-type gate than in the P-type channel region. It is assumed that the impurity concentration in the region is uniform, that the concentration in the P-type region is uniform and that the junction transitions are abrupt.

Figure 6:
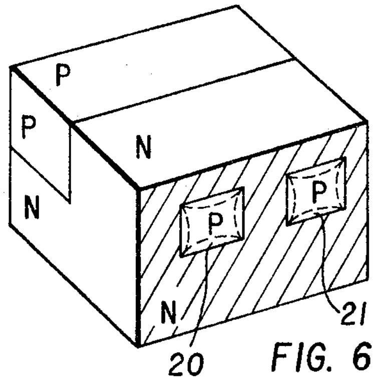
FIGURE 6 is an isometric representation of the transistor showing the space charge around the junction extending into the channel region.

The device of the invention presents an improvement over the conventional design just described, in that a lower pinch-off or bias voltage is necessary for a given transconductance level. As shown in FIGURE 6, the channel region is reduced by space charge regions 20 and 21 from four sides instead of two as in the conventional design, thus effectively reducing the channel thickness a greater amount for the same potential.

Figure 1:
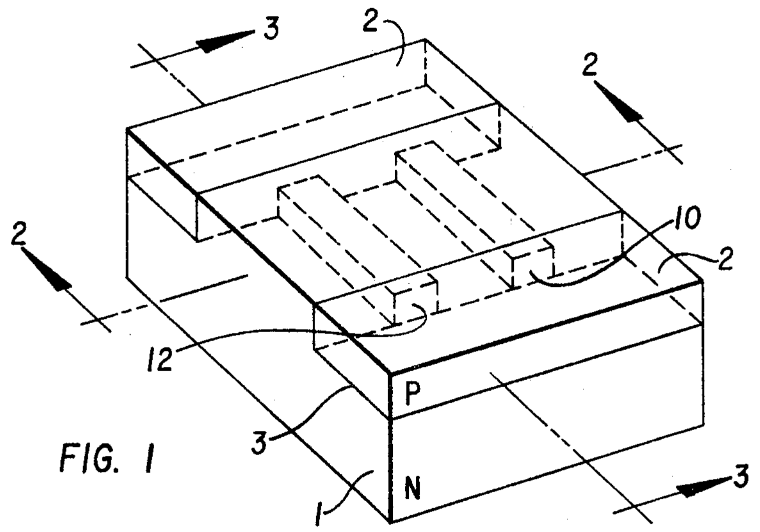
FIGURE 1 is an isometric illustration of the semiconductor device with the internal structure of interest shown in dotted lines.
Figure 2:
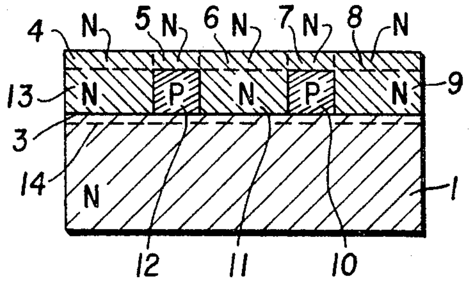
FIGURE 2 is a cross sectional view of the device of FIGURE 1, taken along section line 2—2, transverse to the channel.
Figure 3:
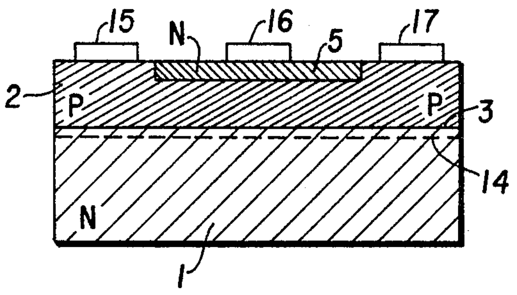
FIGURE 3 is a longitudinal view of a channel taken along the section line 3—3, extending for the entire length of the substrate.
Figure 4:
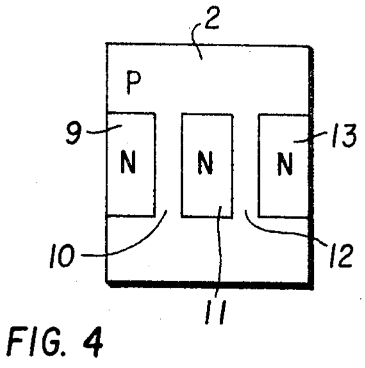
FIGURE 4 is a top view of the semiconductor wafer showing the masking for the first diffusion.

Referring now to FIGURES 1, 2 and 3, the device of the invention comprises an N-type substrate 1 on which a P-type epitaxial layer 2 is deposited. Alternate stripes 9, 11 and 13 (see FIGURE 2), which preferably do not extend the length of the wafer (see FIGURE 4), are diffused with an N-type impurity to provide alternate P-regions 10 and 12 and N-regions 9, 11 and 13. The diffused N-type regions 9, 11 and 13 extend to the N-substrate 1. A second N-type impurity diffusion indicated by regions 4, 5, 6, 7 and 8 is then made over said first N-type impurity diffusion, including the P-stripes region 10 and 12. The result is P-channels 10 and 12 extending lengthwise through the substrate, each completely enclosed by N-type regions and each joining the two parts of P-region 2 which have been separated by the N-type diffusion. FIGURE 2 shows the enclosed P-channels in cross section where the section has been taken transverse to the channel. Also illustrated in FIGURE 2 are the regions formed by the two N-type diffusions. In the first diffusion three N-regions are formed, one region comprised of 4 and 13, a second region comprised of 6 and 11 and a third region comprised of 8 and 9. The second diffusion is confined to the regions 4, 5, 6, 7 and 8. The dotted line 14 is the junction first formed between the N-substrate and the P-epitaxial layer and the 3 is the junction between the substrate 1 and P-layer 2 after the back-diffusion which is hereinafter described. No junction exists between the N-diffused regions 9, 11 and 13 and substrate 1, but the line has been included to illustrate the position of the junction between N-substrate 1 and P-layer 2 after back-diffusion takes place and before the N-diffusion is made into the P-layer 2. FIGURE 3, on the other hand, shows channel 12 joining the two parts of P-region 2. In the illustration, FIGURE 1, two channels 10 and 12 are shown, but the number of channels may be one or more depending upon the desired device.

In order to connect the transistor to an external circuit, contacts 15, 16 and 17 are connected in any suitable manner. Although attaching contacts to both N-region 5 and substrate 1 may be desirable since a slightly lower pinch-off voltage would result, the contact to substrate 1 is not necessary since a connection exists between the epitaxial layer 2 and the contact 14 through the N-region surrounding the P-channel. Contacts have been omitted in FIGURES 1 and 2, but shown in FIGURE 3 to illustrate the regions to which contact is made.

Although the preferred example describes a device with a P-type channel and N-type gates, a device with an N-type channel and P-type gates would work equally as well.

The method of constructing the device is as follows by way of example: A silicon wafer 10 mils thick is doped to .001 ohm-cm. with N-type doped arsenic. A .4 ohm-cm. P-layer, 2 mils thick, is epitaxially deposited and then back-diffused so the P-layer is about .08 mil thick. Back-diffusion is the diffusion of the N-type impurities in the substrate 1 into the P-layer 2. This results from the N-substrate having a higher impurity concentration than the P-layer. Phosphorous is then diffused in a stripe pattern to leave alternate P- and N-stripes, the N-stripes being .1 mil wide and the P-stripes .05 mil wide. The diffused N-stripes extend through the P-layer and connect with the N-substrate. A second diffusion is then made into all the stripes, including the P-stripes, to a depth to leave a P-layer .05 mil wide. The resulting P-channel has a cross section .05 mil on each side. Contacts are attached to the transistor to complete the unencapsulated device in a conventional manner.

Although the invention has been described with reference to a specific embodiment, it will be apparent that certain modifications and substitutions will fall within the scope of the invention as defined by the appended claims.

What is claimed is:

1. A semiconductor device comprising an N-type substrate, an epitaxially grown P-type layer on said substrate, and N-type stripes in said P-type layer separated by P-stripes, said P-stripes connecting two distinct regions of said epitaxial P-type layer.

2. A semiconductor device comprising an N-type substrate, an epitaxially grown P-type layer on said substrate, and a P-type channel region in said epitaxial P-type layer surrounded by an N-type impurity region in said epitaxial P-type layer, said channel region interconnecting two distinct regions of said epitaxial P-type layer having no N-type impurity layer therein.

3. A semiconductor device comprising an N-type substrate, an epitaxially grown P-type layer on said substrate, said layer being separated into two distinct regions by an N-type region, and said two distinct regions being connected by a P-type channel through said N-type region.

4. A semiconductor device comprising a substrate of N-type doped silicon, an epitaxial layer on said substrate, said layer comprising at least one P-type channel connecting two distinct P-type regions, said one channel being completely surrounded by an N-type region separating said two P-type regions, said P-type channel and P-type regions being entirely within said epitaxial layer.

5. A semiconductor device comprising a plurality of isolated current paths within an epitaxial layer, said isolated paths connecting two distinct regions of said semiconductor device separated by a third region, said paths and said two distinct regions being of material of one conductivity type, and said third region being of a material of opposite conductivity type from that in said two distinct regions and said paths.

6. The method of making a semiconductor device comprising the steps of epitaxially growing a P-type layer of semiconductor material on an N-type substrate, diffusing stripes of N-type impurities into said P-type layer to produce alternate regions of P-type and N-type material, diffusing N-type impurities into said alternate P-type and N-type regions to produce P-type channels interconnecting two distinct P-type regions, and attaching contacts to said P-type and N-type regions.

7. The method of making a semiconductor device comprising the steps of epitaxially growing a P-type layer about .2 mil thick doped to about 4 ohm-cm. onto a silicon wafer about 10 mils thick doped with an N-type impurity to about .001 ohm-cm., back-diffusing the N-type impurity of the N-doped silicon wafer into the P-type layer until said layer is about .08 mil thick, diffusing into the surface of the P-type layer an N-type impurity to produce alternate P-type and N-type stripes, the diffused N-type stripes extending through the P-type layer and connecting with the N-doped silicon wafer, diffusing an N-type impurity into both P-type and N-type stripes to produce a P-type layer about .05 mil wide, and attaching contacts to the P-type and N-type layers.

8. The method of claim 6 wherein the N-type substrate is doped with arsenic.

9. The method of claim 6 wherein the N-type impurity used in said first and second diffusion is phosphorous.

References Cited by the Examiner

UNITED STATES PATENTS

| | | | |
|---|---|---|---|
| 2,561,411 | 7/1951 | Pfann | 148—187 |
| 2,623,102 | 12/1952 | Shockley | 148—33 |
| 2,692,839 | 10/1954 | Christensen et al. | 148—175 |
| 2,763,581 | 9/1956 | Freedman | 148—175 |
| 2,936,256 | 5/1960 | Hall | 148—33 |
| 3,025,438 | 3/1962 | Wegener | 148—33 |
| 3,033,714 | 5/1962 | Ezaki et al. | 148—33 |
| 3,059,158 | 10/1962 | Doucette et al. | 148—33 |

OTHER REFERENCES

Article in Electronic Design, "Epitaxial Process to Take Leading Role," November 23, 1960, pp. 37–40.

Roehr: "Epitaxial Process Improves Transistor Characteristics," Electronics, March 3, 1961, pp. 52–53.

Theuerer et al.: "Epitaxial Diffused Layers," Proceedings of the IRE, September 1960, pp. 1642–1643.

HYLAND BIZOT, *Primary Examiner.*

DAVID L. RECK, *Examiner.*

N. F. MARKVA, *Assistant Examiner.*